US005385752A

United States Patent [19]

Steele

[11] Patent Number: 5,385,752

[45] Date of Patent: Jan. 31, 1995

[54] METHOD AND APPARATUS FOR COATING INTERIOR SURFACES

[76] Inventor: Wesley M. Steele, P.O. Box 28, Vidalia, La. 71373

[21] Appl. No.: 135,979

[22] Filed: Oct. 14, 1993

[51] Int. Cl.$^{6}$ ........................ B32B 35/00; B05B 13/00

[52] U.S. Cl. .................................... 427/140; 427/306; 427/317; 427/230; 427/355; 427/369

[58] Field of Search ................ 118/306, 317; 427/240, 427/230, 239, 140, 355, 369

[56] References Cited

U.S. PATENT DOCUMENTS

| | | | |
|---|---|---|---|
| 2,102,738 | 5/1936 | Perkins | 91/44 |
| 2,387,362 | 4/1944 | Stewart . | |
| 3,044,441 | 5/1960 | Blakeslee et al. | 118/317 |
| 3,653,951 | 4/1972 | Maldeis | 427/140 |
| 3,719,168 | 3/1973 | Kazee | 118/306 |
| 4,108,384 | 8/1978 | Egli | 239/665 |
| 4,414,918 | 11/1983 | Nelson Holland et al. | 118/306 |
| 4,440,350 | 4/1984 | Dietz et al. | 239/703 |
| 4,499,118 | 2/1985 | Dietz et al. | 427/28 |
| 5,002,438 | 3/1991 | Strong | 405/303 |
| 5,092,265 | 3/1992 | Hughes et al. | 118/317 |
| 5,106,440 | 4/1992 | Tangeman | 156/94 |
| 5,107,313 | 5/1991 | Trimble | 264/32 |
| 5,246,641 | 9/1993 | Perkins et al. | 264/35 |

*Primary Examiner*—Janyce Bell
*Attorney, Agent, or Firm*—Jones, Tullar & Cooper

[57] ABSTRACT

A method and apparatus for coating an interior surface in which a spinning vaned plate is used to apply a low-water-content mortar-like substance to an interior surface, such as a manhole, wetwell or similar structure. A tank containing the mortar-like substance is positioned above the vaned plate, and a valve is located between the tank and the vaned plate for controlling the flow of mortar-like substance from the tank to the spinning vaned plate. An agitating element such as a vibrator head is associated with the tank for inducing the mortar-like substance to flow freely. The apparatus may be lowered into a structure, and the mortar-like substance applied to the interior walls without a worker having to enter the structure.

20 Claims, 4 Drawing Sheets

FIG. 5
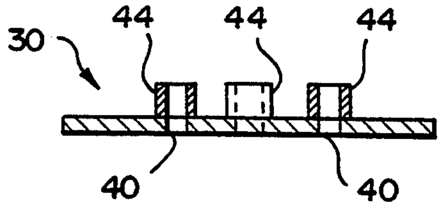
FIG. 7
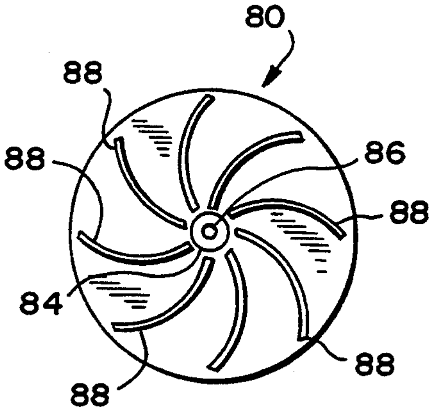
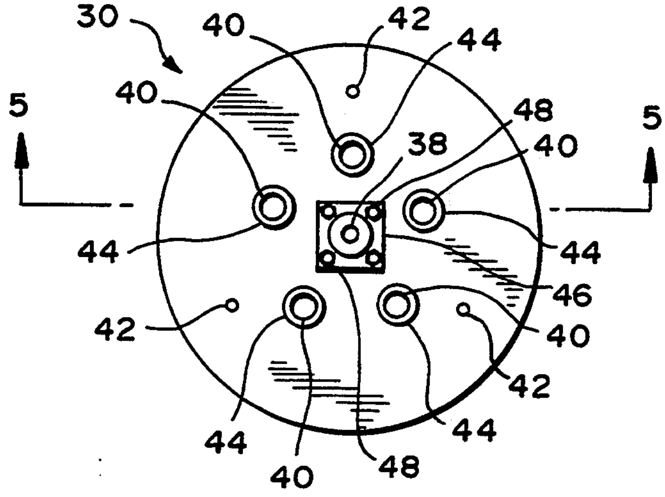
FIG. 4
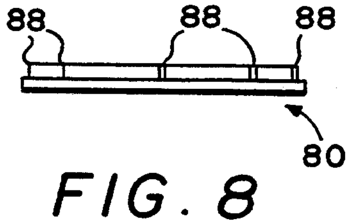
FIG. 8
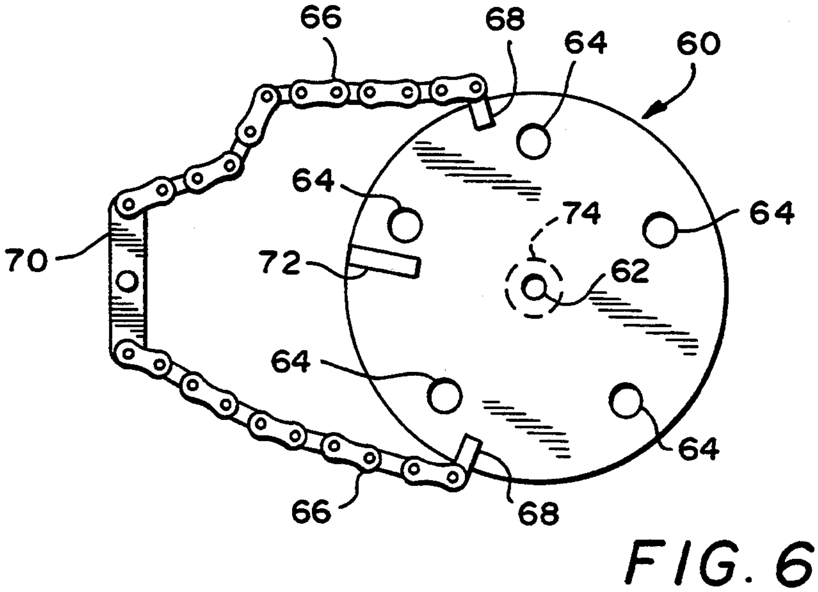
FIG. 6

METHOD AND APPARATUS FOR COATING INTERIOR SURFACES

FIELD OF THE INVENTION

The present invention is directed generally to a method and apparatus for applying a coating to an interior surface. More particularly, the present invention is directed to a method and apparatus for applying a coating of a mortar-like substance to the interior of a manhole, a wetwell, or a similar structure. Most specifically, the present invention is directed to a method and apparatus for applying a mortar-like substance to the interior of a manhole, wetwell, or similar structure by slinging the mortar-like substance onto the interior surface by remote operation, making it unnecessary for a worker to enter the structure.

DESCRIPTION OF THE PRIOR ART

Manholes, wetwells, and similar structures are typically constructed as excavations in the ground lined with a sealing and supporting lining. The sealing and supporting lining is important not only for maintaining the integrity of the structure against collapse, but also for preventing ground water and rain water from infiltrating into the structure. These sealing and supporting linings may be constructed using a variety of construction techniques. In the past, such construction techniques have included the use of bricks, tiles, or concrete blocks bonded together with mortar. More recently the linings have also been constructed using pre-cast, cast-in-place, or shotcreting techniques which create a monolithic lining with superior sealing performance.

In recent years, the linings of manholes for sewer systems in particular have become an increasing concern in a number of municipalities. These manholes are generally chimney-like structures which have a round upper opening which typically diverges downward toward a larger non-uniform area in which access may be had to the sewer pipes. Should the lining of the manhole be cracked, or otherwise improperly sealed, groundwater, floodwater, or rainwater may enter the manhole, and thereby the sewer system. If such water enters the sewer system in sufficient quantity, it may cause flooding of the system and overloading of downstream sewage treatment facilities. This can result in raw sewage being discharged directly into the environment either by back up of the sewage system, or by discharge through the treatment facility's emergency overflow drains. Furthermore, even if the treatment facility is able to handle the increased flow, the additional water adds to the cost of operating the treatment facility since this water normally would not require treatment had it not entered the sewage system.

Unfortunately, many of the country's sewage systems are old and deteriorating. Most of the linings of the manholes in these older systems were constructed using brick or concrete block bonded together by mortar, and are particularly susceptible to leakage and water infiltration. The monolithic type of manhole can also deteriorate, however, due to age, improper construction, poor maintenance or other causes. Thus, there exists a need for an efficient and inexpensive means to repair and rehabilitate these deteriorating manholes.

Manhole rehabilitation has been carried out in the past by having a worker enter the manhole and use a spray gun to spray on a layer of a rehabilitating substance for sealing the manhole via shotcreting or similar techniques. The substances used in the spray guns may be either mortar-based compositions, or resin compounds mixed with a curing catalyst. Such spray gun techniques typically require that several coatings of the rehabilitating substance be sprayed on the manhole lining, followed by troweling, to ensure that a sufficient thickness of the substance has been applied to properly seal and support the manhole structure.

The spray gun system is undesirable since a worker must typically be lowered into a manhole suspended by a rope. This arrangement is not only hazardous to the worker, but may result in an inferior coating job. Also, manholes may contain toxic gases or other substances which the worker is exposed to when entering a manhole to use a spray gun. In addition, since manholes are generally enclosed areas, if the rehabilitating substance contains harmful components or fumes, a worker is also exposed to these, which may be damaging to the worker's health over an extended period of time. Furthermore, some structures are too small to accommodate a worker holding a spray gun.

Another problem with the spray gun system results from the requirement that the rehabilitative substance must be pumped to the worker in the manhole through a hose from a remote location outside the manhole. The rehabilitative substance passes through the hose to a spray gun where compressed air sprays it against the interior surface. If a mortar-based substance is used, it must have a sufficiently high water content to allow it to pass through a pump, flow through the hose without clogging, and be sprayed by compressed air. However, the higher the water content of the substance, the thinner the coating which may be applied. Thus, most spray gun techniques require several coatings to achieve a rehabilitated lining of approximately ⅜ inches. In addition, even when a high water content substance is used, there can be hose, pump, or gun clogging problems, wasted material in the hose, and the necessity of cleaning the hose, pump, and gun following each use.

It is also known in the prior art to apply a resinous coating to the interior of a manhole by lowering an apparatus into the manhole. The resin is cured by mixing with a curing catalyst just prior to application. The catalyst and resin are pumped independently from remote locations through hoses, and are discharged just above a spinning vaned impeller suspended within the manhole by a hoist. The impeller mixes the catalyst and resin, and propels the mixture against the interior surface of the manhole.

This method is less than desirable since the resin requires mixture with a catalyst for setting, and the resin or catalyst may be flammable, or may produce fumes hazardous to workers. In addition, special chemicals are required for cleaning equipment after each use, further increasing cost of operation. Furthermore, the rehabilitated resin lining generally does not have the same structural strength as a mortar-like lining, and there is generally a higher cost for materials.

It will be apparent that a need exists for a method and device for rehabilitating the interior surfaces of structures such as manholes, which overcomes the limitations of the prior art devices. The method and apparatus in accordance with the present invention overcomes the limitations of the prior devices and provides a significant advance in the art.

SUMMARY OF THE INVENTION

It is an object of the present invention to provide a method and apparatus for applying a coating to an interior surface.

Another object of the present invention is to provide a method and apparatus for rehabilitating structures such as manholes which does not require a worker to enter the structure, and which does not produce hazardous fumes.

A further object of the present invention is to provide a method and apparatus for applying a low water content mortar-like substance to an interior surface.

Yet another object of the present invention is to provide a method and apparatus for coating interior surfaces which does not require the coating substance to be pumped through a hose from a remote location.

An additional object of the present invention is to provide a method and apparatus for applying a relatively thick coating of a mortar-like substance to an interior surface in a single application.

As will be discussed in detail in the description of the preferred embodiment which is set forth subsequently, the coating apparatus in accordance with the present invention has a spinning vaned plate which enables it to apply a coating material such as a mortar-like substance to an interior surface such as a manhole. A tank containing freshly mixed mortar-like substance is positioned above the spinning vaned plate, and a valve is located between the tank and the spinning vaned plate for controlling the flow of mortar-like substance from the tank to the spinning vaned plate. An agitating element such as a vibrator head is associated with the tank for inducing the mortar-like substance to flow freely.

The apparatus may be lowered into a manhole or similar structure, and the mortar-like substance applied to the interior walls without a worker having to enter the structure. The valve may be activated remotely by a valve lever attached to the side of the tank, and all the other functions may be controlled remotely from outside the manhole. The apparatus is able to apply a low-water-content mortar-like substance in a coating of up to three inches thickness in a single application. Furthermore, the apparatus may be small enough to enter a structure that is too narrow to admit a worker.

The present invention provides a method of applying a mortar-like coating to the interior surface of a structure that does not require a worker to enter the structure. The structure may first be cleaned using high pressure water or other techniques. The mortar-like substance may then be propelled against the interior surface of the structure by impacting the mortar-like substance against a spinning vaned plated. An agitating device may be used to make the mortar-like substance more flowable, particularly when a low-water-content mortar-like substance is to be used for coating. By using a low-water-content mortar-like substance, a structure surface may be rehabilitated by applying a single coating of up to three inches in thickness. Following application of the coating, if the manhole is safe for a worker to enter, the coating material may be trowelled smooth, further increasing the strength and sealing properties of the coating.

The method and apparatus in accordance with the present invention overcome the limitations of the prior art devices and provide a method and apparatus for applying a coating to the interior surface of a manhole, or similar structure, by coating the interior surface of the structure with a mortar-like substance without requiring a worker to enter the structure. The method and apparatus of the present invention provide a substantial advance in the art.

BRIEF DESCRIPTION OF THE DRAWINGS

While the novel features of the method and apparatus in accordance with the present invention are set forth with particularity in the appended claims, a full and complete understanding of the invention may be had by referring to the detailed description of the preferred embodiment which is set forth subsequently, and as illustrated in the accompanying drawings in which:

FIG. 4 is a view of a bottom plate as taken along line 4—4 in FIG. 3;

FIG. 5 is a partial side view of the bottom plate of FIG. 4, as taken along line 5—5 in FIG. 4;

FIG. 6 is a view of a valve plate and chain assembly as taken along line 6—6 in FIG. 3;

FIG. 7 is a view of a vaned plate as taken along line 7—7 in FIG. 3; and

FIG. 8 is a side view of the vaned plate of FIG. 7.

DESCRIPTION OF THE PREFERRED EMBODIMENT

Figure 1:
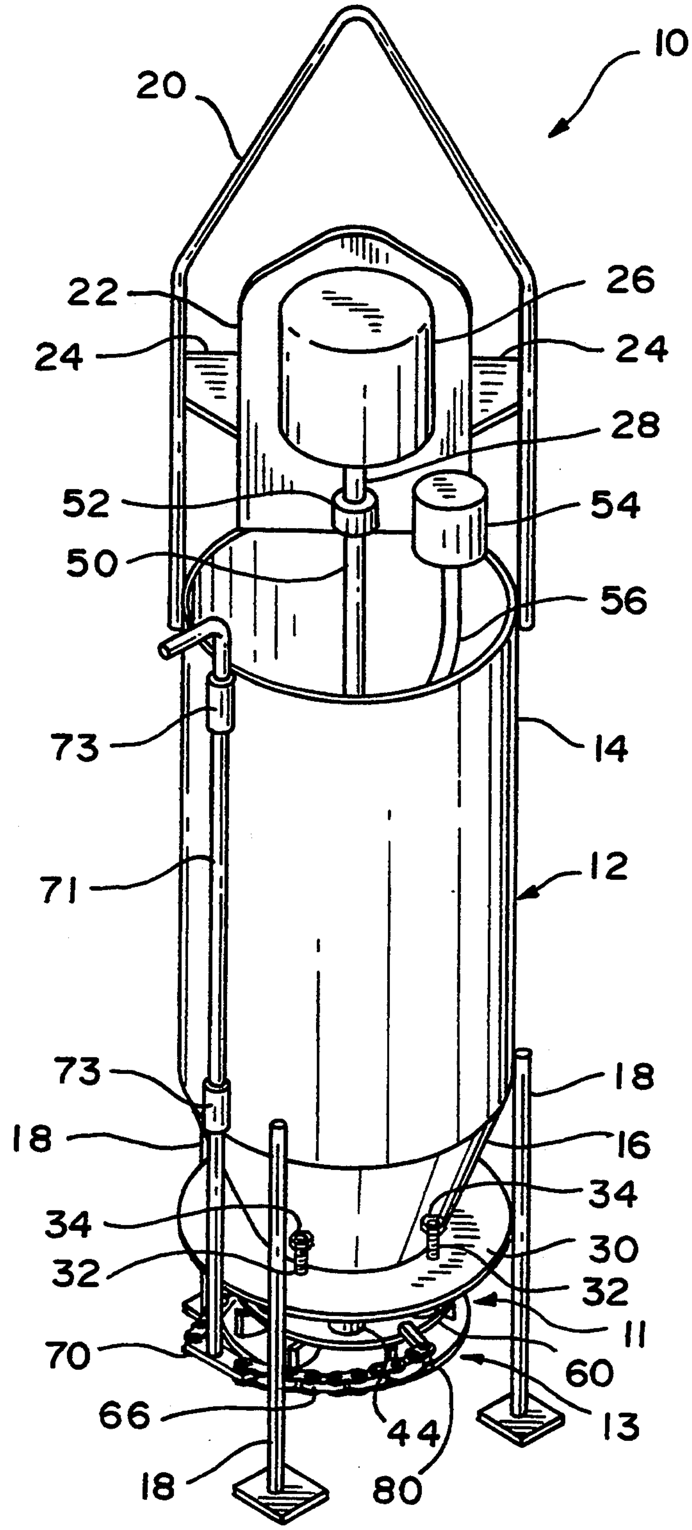
FIG. 1 is a perspective view of a preferred embodiment of a coating apparatus in accordance with the present invention.

Referring initially to FIG. 1, there is illustrated generally at 10 a perspective view of a preferred embodiment of a coating apparatus in accordance with the present invention. Coating apparatus 10 includes a flow control means 11 located at the bottom of an open-ended tank 12. A slinging element 13 is located below tank 12 and flow control means 11. A coating material such as a mortar-like substance (not shown) may be placed in tank 12, and may flow through flow control means 11, coming into contact with slinging element 13. The mortar-like substance is impacted by slinging element 13, propelling the mortar-like substance against an interior surface of a structure (not shown). Tank 12 is made of sheet metal, and has a main cylindrical portion 14 and a conical portion 16 located below cylindrical portion 14. Three legs 18 are fixed to the lower end of cylindrical portion 14 of tank 12 for enabling coating apparatus 10 to stand upright unsupported. A lifting support 20 is fixed to the upper end of tank 12 so that coating apparatus 10 may be supported by a hoist (not shown). Lifting support 20 is generally in the shape of an inverted "v", and may be made from a metal rod. A motor support plate 22 is also fixed to the upper end of tank 12, and connected to lifting support 20 by a pair of strut plates 24 for structural stability. A drive motor 26, having an output shaft 28, is mounted on motor support plate 22, with output shaft 28 directed toward the bottom of tank 12. Motor support plate 22 is offset from the center of tank 12 so that when drive motor 26 is mounted on motor support plate 22, output shaft 28 is located on the central axis of tank 12. Drive motor 26 is an electric motor in the preferred embodiment, but any known type of motor may be used.

Figure 2:
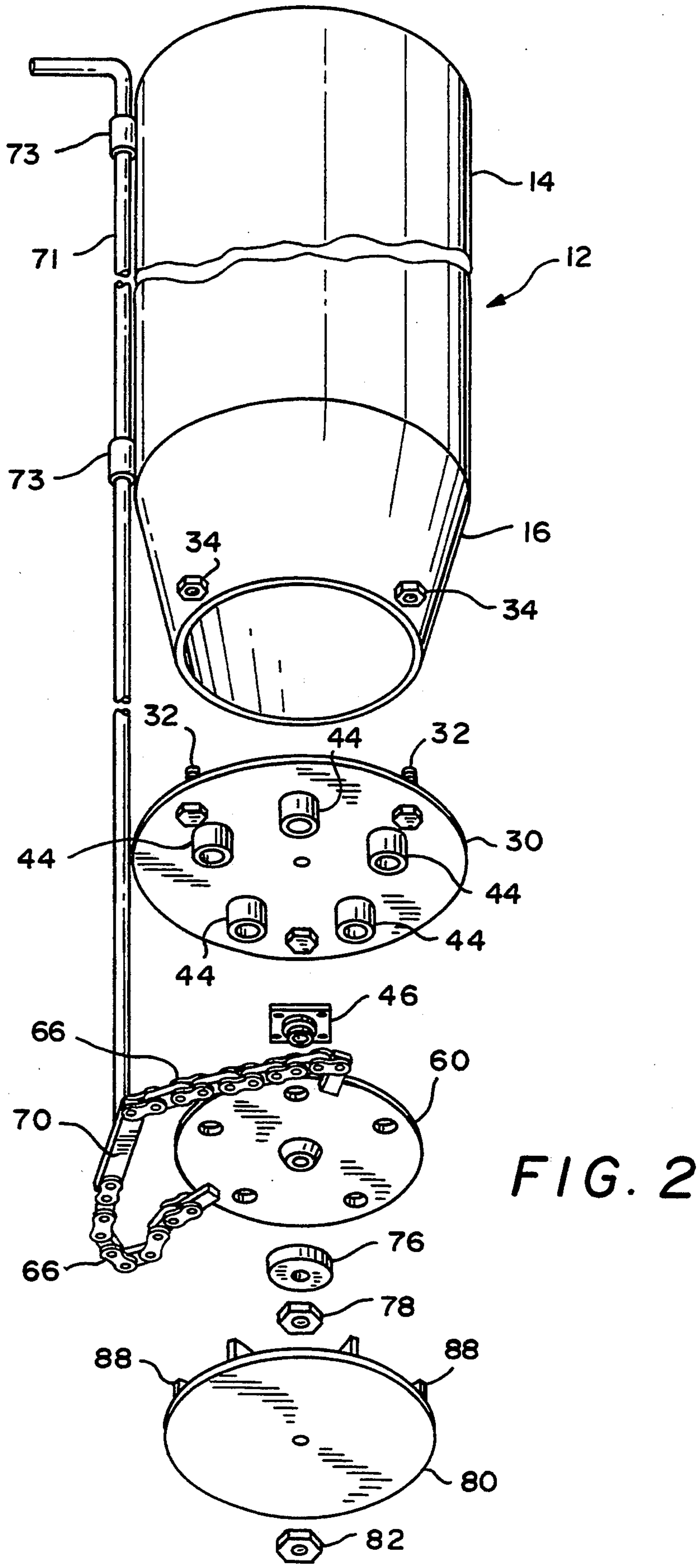
FIG. 2 is an exploded view of the embodiment of FIG. 1, with the legs, drive shaft, motors, and supports omitted for clarity.
Figure 3:
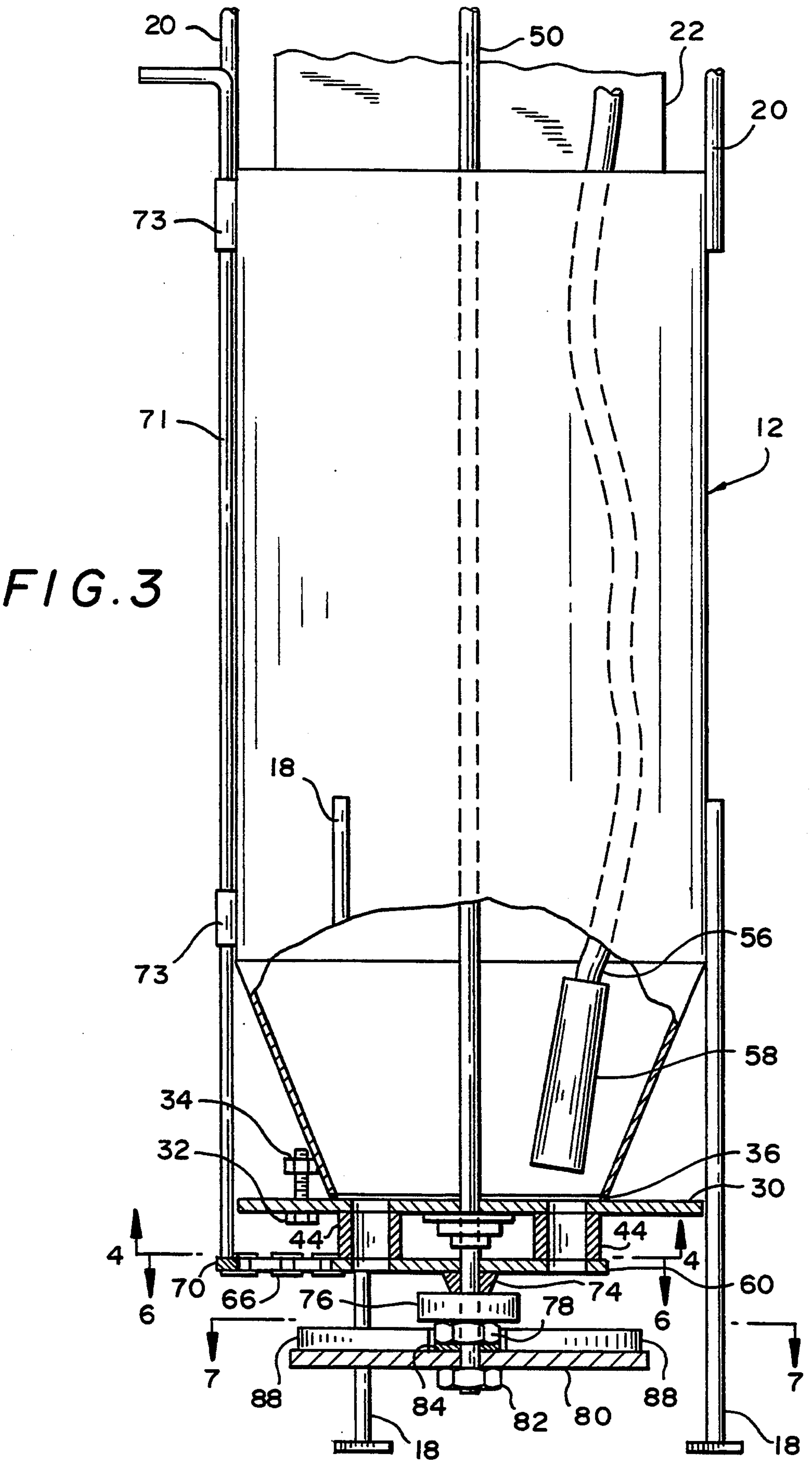
FIG. 3 is an elevation view, partly in cross-section, of the coating apparatus of FIG. 1.

As illustrated in FIGS. 2 and 3, a circular bottom plate 30 is bolted to the bottom of conical portion 16 of tank 12 by bolts 32 which engage with nuts 34. Nuts 34 are attached to conical portion 16 of tank 12 by welding or other known methods. A gasket 36, which may be a bead of silicon or caulk, is disposed between bottom plate 30 and the bottom of tank 12 for sealing the joint between the two. A center hole 38 is located at the center of bottom plate 30, and, as may be seen more clearly in FIGS. 4 and 5, five additional large holes 40 are located radially about center hole 38 for enabling the mortar-like substance to flow out of the bottom of the tank 12. Three smaller bolt holes 42 are also located radially around center hole 38 for receiving bolts 32 for attaching bottom plate 30 to tank 12. Five hollow cylindrical nipples 44 are affixed to the bottom side of bottom plate 30, encircling each of the five large holes 40 so that the mortar-like substance may flow through nipples 44 from large holes 40. A sealed bearing 46 is attached to bottom plate 30 by machine screws 48, and is centered over center hole 38.

Returning to FIG. 1, a drive shaft 50 is connected to motor output shaft 28 by a coupling 52. Drive shaft 50 extends through the center of tank 12, and beyond bottom plate 30, passing through center hole 38 and being supported therein by bearing 48. Also mounted on motor support plate 22 is a vibrator motor 54 having a flexible shaft 56 extending downward toward the bottom of tank 12. Flexible shaft 56 has an outer casing of flexible tubing or similar known structure to seal the internal rotating portion (not shown) of flexible shaft 56. As illustrated in FIG. 3, a vibrator head 58 is connected to the distal end of flexible shaft 56 near the bottom of tank 12. Vibrator head 58 is of a known commercially available type having an internal eccentric member (not shown) which is rotated by flexible shaft 56, causing vibrator head 58 to produce vibrations. When tank 12 is filled with a low water content mortar-like substance, the vibrations from vibrator head 58 cause the mortar-like substance to become flowable. Alternatively, an impeller (not shown) may be mounted on drive shaft 50, or other agitating devices may be used, but a vibrator has been found to produce the best flowability in the preferred mortar-like substance.

Flow control means 11 includes a valve plate 60 mounted below, and abutting against, nipples 44 on bottom plate 30, with drive shaft 50 extending through a central hole 62 in valve plate 60. As illustrated in FIG. 6, valve plate 60 has center hole 62 and five radially located valve holes 64 which are approximately the same size as large holes 40 and nipples 44 on bottom plate 30. Valve holes 64 are located such that they may be aligned with nipples 44 and large holes 40 so that the mortar-like substance may pass through valve plate 60. There is sufficient space between valve holes 64 so that if valve plate 60 is rotated, the space between valve holes 64 may completely seal the openings of nipples 44, preventing the mortar-like substance from flowing out of tank 12.

A pair of chains 66 each have first ends attached to valve plate 60 by chain tabs 68, and are connected at their second ends to a valve lever 70. As shown in FIG. 1, valve lever 70 is fixed to the base of an elongate valve control handle 71, which is rotatably mounted on tank 12 by bushings 73. Valve control handle 71 may be rotated to rotate lever 70, thereby moving chains 66 to rotate valve plate 60 about drive shaft 50. Valve plate 60 may be rotated to align valve holes 64 with large holes 40 and nipples 44 on bottom plate 30. A valve stop 72 is welded to valve plate 60 so that rotation of valve plate 60 will be halted when valve holes 64 are aligned with nipples 44 and large holes 40. Alternatively, valve lever 70 may be used to rotate valve plate 60 in the other direction to close off nipples 44 and large holes 40, preventing the mortar-like substance from flowing out of tank 12.

As illustrated in FIG. 3, a circular raised flange 74 is welded to the bottom of valve plate 60 for contacting the upper surface of a thrust bearing 76. A first nut 78 is threaded onto drive shaft 50 below thrust bearing 76 for retaining it and valve plate 60 on drive shaft 50, and for controlling the force with which valve plate 60 bears against nipples 44. A vaned plate 80 is mounted on drive shaft 50 below first nut 78, and is held on drive shaft 50 by a second nut 82 in such a way that vaned plate 80 rotates as drive shaft 50 is rotated. As illustrated in FIGS. 7 and 8, vaned plate 80 has a circular flange 84 fixed at its center, with a center hole 86 extending through vaned plate 80 and the circular flange for receiving drive shaft 50. Eight generally radially extending vanes 88 are fixed to the upper side of vaned plate 80, and extend generally outwardly from the central flange 84. Vanes 88 are curved in the preferred embodiment, but may be straight or otherwise shaped, and may be more or less numerous. It will be apparent that the five radially located valve holes 64 in valve plate 60 provide an evenly distributed flow of the mortar-like substance to vaned plate 80. Since the flow of mortar-like substance is evenly distributed about vaned plate 80, when the mortar-like substance is impacted by vaned plate 80 as it rotates, a more even coating is created on the interior surface of a structure than would be the case if there were only one or two flow openings.

In use, an interior surface such as a manhole is located for rehabilitation. The manhole interior is first cleaned using high pressure water, and any debris is removed. The mortar-like substance is then mixed using a conventional cement mixer or other known means. The preferred coating material may be a commercially available motor-like substance such as Quad-X-QM-1 available from Arkansas Meter Co. of Arkansas. Quad-X is a cement based substance having granite and polypropylene reinforcing fibers mixed therein. When mixed, the mortar-like substance is preferably approximately 15–20 percent water by weight, although higher percentages of water may be used. At the preferred water percentage, however, the mortar-like substance is rather thick and will not flow freely.

The mortar-like substance is placed in tank 12, and coating apparatus 10 is lowered into the manhole using a hoist or other lifting device (not shown) connected to lifting support 20. Valve control handle 71 is rotated, rotating valve plate 60 to align valve holes 64 with nipples 44. Drive motor 26 is also activated, causing drive shaft 50 to spin at high speed, which rotates vaned plate 80 at the same speed. If the preferred low-water-content mortar-like substance is used, the mortar-like substance will not be flowable at this point, and will remain in tank 12. However, when vibrator motor 54 is activated, causing vibrator head 58 to produce vibrations, these vibrations cause the mortar-like substance to flow freely. Thus, after vibrator motor 54 is activated, the mortar-like substance will flow from tank 12, through large holes 40, nipples 44, and valve holes 64, and strike the spinning vaned plate 80, propelling or slinging the mortar-like substance outwardly from vaned plate 80 and against the interior wall of the manhole. The lifting device is used to move the coating apparatus vertically while the mortar-like substance is being propelled outwardly so that an even coating of the mortar-like substance is applied to the interior surface of the manhole. In the preferred embodiment, a layer up to three inches thick may be applied in a single pass of the coating apparatus. However, additional layers may be applied, particularly if a higher water content is used when mixing the mortar-like substance. A low-water-content coating is preferred, however, because of the savings gained in time and manhours in just applying a single coating. In addition, if the manhole is safe, a worker may enter the manhole shortly after the coating apparatus is removed, and may trowel the rehabilitating lining to increase the strength and sealing properties of the lining.

While preferred a embodiment of a coating apparatus and method in accordance with the present invention has been set forth fully and completely hereinabove, it will be apparent to one of skill in the art that a number of changes in, for example the sizes and shapes of the various components, the means of activating the valve plate, the types of motors used, and the like can be made without departing from the true spirit and scope of the present invention which is accordingly to be limited only by the following claims.

What is claimed is:

1. An apparatus for coating an interior surface, said apparatus comprising:
- a tank for containing a coating material;
- slinging means positioned below said tank for applying said coating material to a surface;
- flow control means for controlling the flow of said coating material from said tank to said slinging means; and
- vibration producing means acting on said coating material in said tank, said vibration producing means improving flowability of said coating material from said tank to said slinging means.

2. The apparatus according to claim 1 wherein said vibration producing means includes a vibrator head, a motor, and a flexible shaft, said flexible shaft connecting said vibrator head to said motor.

3. The apparatus according to claim 2 wherein said vibrator head is at least partially submerged in said coating material.

4. The apparatus according to claim 1 wherein said slinging means includes a spinning plate having a plurality of vanes thereon.

5. The apparatus according to claim 1 wherein said flow control means has a plurality of radially located openings useable to more evenly distribute said coating material during delivery of said coating material to said vaned plate.

6. The apparatus according to claim 1 wherein said flow control means is remotely operable.

7. An apparatus for applying a coating material to an interior surface of a manhole, said apparatus comprising:
- a tank for containing said coating material;
- slinging means mounted below said tank for propelling said coating material against said interior surface; and
- flow control means for controlling a flow of coating material from said tank to said slinging means, said flow control means having a plurality of remotely adjustable radially located openings for said coating material to flow through, said radially located openings generally evenly distributing said flow of said coating material to said slinging means.

8. The apparatus according to claim 7 further including a coating material agitating means.

9. The apparatus according to claim 7 further including an elongate handle mounted on said tank in communication with said flow control means for remotely adjusting said radially located openings.

10. The apparatus according to claim 7 wherein said slinging means includes a spinning vaned plate.

11. A method of applying a coating material to an interior surface of a manhole, said method comprising:
- locating a manhole having an interior surface to be coated;
- providing a coating material in a tank for application to said interior surface of said manhole;
- producing vibrations in said coating material in said tank for increasing the flowability of said coating material from said tank to a slinging means; and
- slinging said coating material against said interior surface of said manhole for forming at least a single coating on said interior surface.

12. The method of claim 11 further including the step of troweling said coating material following application of said coating material to said interior surface.

13. The method of claim 11 further including providing a spinning vaned plate and impacting said coating material against said spinning vaned plate to accomplish said slinging of said coating material.

14. The method of claim 11 further including providing a vibrator head and producing vibrations in said coating material by activating said vibrator head.

15. An apparatus for applying a coating material to the interior surface of a structure, said apparatus comprising:
- slinging means for propelling said coating material against said interior surface;
- a motor in communication with said slinging means for imparting motion to said slinging means;
- delivery means for delivering said coating material to said slinging means;
- flow control means for controlling the flow of said coating material from said delivery means to said slinging means; and
- vibration producing means associated with said delivery means, said vibration producing means improving flowability of said coating material from said delivery means to said slinging means.

16. The apparatus according to claim 15 wherein said delivery means includes a tank for containing said coating material.

17. The apparatus according to claim 15 wherein said flow control means is remotely operable.

18. The apparatus according to claim 15 wherein said slinging means includes a rotatable vaned plate mounted on a shaft connected to said motor.

19. The apparatus according to claim 18 wherein said flow control means includes means for radially distributing said coating material about said vaned plate.

20. The apparatus according to claim 15 wherein said vibration producing means is a vibrator head in contact with said coating material.

* * * * *